Patented July 13, 1954

2,683,669

UNITED STATES PATENT OFFICE 2,683,669

CONDUCTIVE PLASTICS AND METHOD OF MAKING THE SAME

Myron A. Coler, New York, N. Y.

No Drawing. Application April 15, 1950,
Serial No. 156,229

17 Claims. (Cl. 106—193)

This invention relates to conductive plastics and more particularly to conductive plastic products of the type wherein conductivity is obtained by incorporating carbon therein. The term "plastic" as used herein embraces any one of a large and varied group of materials commonly referred to as plastics and resins and characterized as organic substances of large molecular weight.

In general the conductive plastics of the present invention have conductivities intermediate between those of the metals and those of untreated plastics; in most cases their conductivity is of the order of magnitude of that of concentrated electrolytic solutions. Plastic compositions embodying the present invention are adapted to be used in making electric circuit elements having intermediate conductivities and for a variety of other purposes for which moderate conductivity coupled with the physical characteristics of a plastic is desirable.

Prior efforts to produce conductive plastics by a mixture of carbon and a plastic have not been entirely successful largely because of the fact that when using the previously proposed techniques a relatively large proportion of carbon had to be added to the plastic in order to secure the desired conductivity. The use of such a large proportion of carbon undesirably alters the physical properties of the plastic. Moreover, the prior products do not, in general, have good reproducibility, that is to say, their conductivity tends to vary substantially as between independently prepared batches.

It is accordingly an object of the present invention to provide an improved carbon-containing conductive plastic. It is another object of the invention to provide a conductive plastic containing substantially less carbon than has previously been used and having a much higher conductivity in relation to the amount of carbon used. It is still another object of the invention to provide a carbon-containing plastic wherein the physical characteristics of the plastic are substantially unchanged. It is a further object of the invention to provide a conductive plastic which is reproducible both as to conductivity and physical characteristics and of which the conductivity may be accurately predetermined. It is still another object of the invention to produce conductive plastics that can be used in making resistors having relatively low and more nearly constant temperature coefficients of resistivity. It is a still further object of the invention to provide a conductive plastic suitable for use at relatively high voltage loads and power dissipation levels. It is still another object of the invention to provide a conductive plastic having improved wearing characteristics. Other objects of the invention will be in part obvious and in part pointed out hereafter.

In one of its broader aspects the method of the present invention comprises cladding the surfaces of comminuted plastic particles with a finely divided conductive carbon such as for example graphite or carbon black. The quantity of finely divided carbon applied is preferably such as to cover a major proportion of the surfaces of the plastic particles to provide a molding powder which may be formed by conventional molding techniques into any of the various desired shapes. By using this method, a conductive plastic can be obtained which, as further pointed out below, contains only a very small proportion of carbon and has exceptionally high conductivity in relation to the amount of carbon used and a high degree of reproducibility. As previously indicated, the product can be formed into electric circuit elements, or it may, for example, be molded in the form of buttons or ornaments which may then be metallized by electroplating a metal thereon.

From an extended investigation of my invention I have determined that the desired improvement in the electrical properties of plastic articles produced in accordance with the invention is generally assured by controlling simultaneously two factors, i. e., an area factor $R_A$ and a volume factor $R_V$ which are defined as follows:

$$R_A = \frac{A_C}{A_P}$$

$$R_V = \frac{V_C}{V_P + V_C}$$

where $A_P$ = area of plastic powder surface
$A_C$ = area of plastic powder surface clad with carbon
$V_P$ = volume of plastic powder
$V_C$ = volume of coating carbon Advantageously, $R_A$ should be in the range of about 0.55 to 1.00 while $R_V$ should be in the range of about 0.00042 to 0.29. Preferably, $R_A$ should be made to fall in the range of about 0.90 to 1.00 and $R_V$ in the range of about 0.0042 to 0.18. It is indeed surprising that such small volumes of carbon relative to the volume of plastic materially improve the electrical and/or thermal conductivity of molded plastic objects. In general, the quantity of carbon applied to the plastic particles is between about 0.1 and 25%, preferably between about 1% and 15% based on the weight of the plastic particles.

The carbon-clad molding powders of the present invention should not be confused with prior carbon-containing plastics wherein a large proportion of carbon is fully dispersed in the plastic by such techniques as mixing the carbon with a solution of the plastic. Where such complete dispersion of the carbon in the plastic is effected there is a tendency for the carbon particles to become imbedded in the plastic and therefore a relatively large amount of carbon must be used to obtain sufficient carbon-carbon contact to secure the desired conductivity. With the present process, on the other hand, it is possible to start with the same plastic and the same grade of carbon powder as previously used and achieve equivalent conductivity with a much smaller proportion of carbon, e. g., only $\frac{1}{10}$ to $\frac{1}{2}$ as much carbon powder as is required with prior techniques. From a practical standpoint, the relatively high carbon loading of the prior art is undesirable since it produces structural weaknesses such as excessive friability and fabricating difficulties and in general, an undesired departure from the physical properties of the untreated plastic results.

The quantity and nature of the carbon cladding on the plastic particles are such that a material improvement of electrical and/or thermal conductivity of the plastic base is effected without destroying the moldability of the powder. Various theories might be advanced to explain the unexpected phenomenon that plastic particles or spherules coated with carbon can still be successfully molded into desired products which exhibit a combination of selected characteristics of plastics and conductors. Suffice it to say, however, that it is only necessary to follow the teachings of this invention; the optimum quantity of any given carbon for any selected plastic to achieve a desired final result in terms of molded products is determinable by simple preliminary experiments.

The resin or plastic powder which may be treated by the process of this invention may be chosen from the large group of molding substances including thermosetting materials like phenolic and ureaformaldehyde plastics and thermoplastic materials like polystyrene, polymethyl methacrylate, vinyl copolymers, cellulose acetate, etc. The plastic particles may already contain compounding ingredients such as fillers like alpha-cellulose, wood flour and mica, lubricants, plasticizers, dyes and pigments.

Any of various finely divided carbons such as colloidal graphite and acetylene black may be used in carrying out the present process. As indicated in the specific examples given hereafter the conductivity obtained by using the present method varies appreciably depending upon the type of carbon used. However, in all cases the conductivity obtained with a given type and quantity of carbon is many times greater when using the present method than when using prior methods.

The finely divided carbon particles may be applied to the surfaces of the comminuted plastics in any of various ways, but I prefer to use what might be designated a simple "smearing" technique. I have found that effective cladding of the comminuted particles of most plastics can be achieved by carefully tumbling and/or ball milling the two powders in physical contact with one another. Adhesion promoting conditions including moderate heating where the plastic is thermoplastic, wetting the surface of the plastic particles with a suitable solvent to increase its tackiness, and the like may be used if desired. Also it is possible to coat the plastic particles with carbon by treating them with a slurry of colloidal graphite. It is important that the plastic should not be in a condition to encase the carbon particles and therefore I prefer, where possible, to use a simple mechanical action such as tumbling or ball milling at room temperature to clad the plastic particles with the finely divided carbon.

The term ball milling is used herein in its generic sense to include any milling process carried out in a rotating shell containing the material to be milled and discrete, inert articles that assist in the milling operation. The discrete articles are usually steel spheres, but may also have other shapes and be made of other inert materials. Moreover, it should be noted that in the present process, the materials are subjected to only a moderate ball-milling, that is, the ball-milling is carried out in such a way that the aggregate of carbon particles are broken up to produce the desired coating of carbon on the plastic particles, but the milling is not carried out under conditions which would cause the plastic particles to be fractured.

In some cases it has been found desirable to coat the plastic particles with two or more different materials such as two different types of carbon or a finely divided carbon and a finely divided metal. For example, as more particularly indicated in Example 3 below, it has been found that plastic particles which are successively clad under suitable conditions with carbon and copper powders may be molded into articles which exhibit a significantly higher conductivity than that of articles made from plastic particles coated with either carbon or copper powder alone. In cases where different powders are successively applied to the surfaces of plastic particles, it has been found generally preferable from the point of view of securing optimum conductivity to apply the finer powder first.

In order to point out more fully the nature of the present invention, the following specific examples are given of illustrative methods of preparing conductive plastic products falling within the scope of the present invention.

*Example 1*

A glass-lined jar, 5" long and 3" in diameter, containing 400 grams of one-eighth inch steel balls was used as a ball mill. The jar was charged with 12.5 grams of acetylene black having an average ultimate particle size of approximately 500 Angstom units, 87.5 grams of minus 200-mesh unmodified unfilled phenol formaldehyde molding powder and the 400 grams of steel balls. The mixture was milled for about 15 hours at approximately 75 R. P. M., at which time the fine carbon powder had coated in excess of 90% of the surface of the coarser plastic material. At the end of this period, the balls were removed from the mixture by passing the mixture through a 10 mesh screen on which the balls were retained and the powder mixture was tumbled for an additional 16 hours at approximately 75 R. P. M.

The molding powder as thus prepared was molded by preforming at a pressure of 20,000 p. s. i and the preformed articles then hot molded at 350° F. for 20 minutes at 10,000 p. s. i., then removed from the mold while still hot. The resulting plastic objects had the surprisingly low resistivity of about one ohm-centimeter.

*Example 2*

A mixture was prepared comprising 90 grams of an unmodified unfilled phenol formaldehyde powder like that of Example 1 and 10 grams of 2-micron colloidal graphite. This mixture was milled for 60 hours in the jar mill of Example 1 with 400 grams of the steel balls and the steel balls were then sieved out as in Example 1.

In molding the resulting powder the press was heated to 350° F., the pressure raised momentarily to 20,000 p. s. i. then immediately lowered to zero p. s. i., then at once raised to 10,000 p. s. i. and held there for 10 minutes at 350° F. The product produced by this process had a resistivity of 35 ohm-centimeters.

*Example 3*

A mixture was prepared of 90 grams of an unmodified phenol formaldehyde resin of 80 to 140 mesh particle size and 10 grams of acetylene black with an average ultimate particle size of approximately 500 Angstrom units. This mixture was milled for about 16 hours in the jar mill of Example 1 at approximately 75 R. P. M. to distribute the acetylene black uniformly over the surfaces of the plastic powder particles. To the milled carbon-coated powder, 10 grams of minus 325 mesh copper powder was added and the milling operation continued for another period of 16 hours at approximately 75 R. P. M. to cause the copper powder to be uniformly distributed over the surfaces of the acetylene black coated, plastic powder particles.

The molding powder thus produced was molded at a pressure of 10,000 p. s. i. for 20 minutes at 350° F. and removed from the mold hot. The resulting product had a resistivity of .39 ohm-centimeter. As previously indicated this resistivity is appreciably lower than that obtained when either acetylene black or copper powder is used along under comparable conditions. Moreover, the order of mixing of the powders is significant, since this result is not achieved if the coarse copper powder is first applied to the plastic particles and the acetylene black thereafter applied to the copper coated, plastic particles.

*Example 4*

The procedure of Example 1 was followed except that 20 mesh polystyrene beads were substituted for the phenol formaldehyde molding powder, the material was molded for 10 minutes instead of 20 minutes, and cooled under pressure instead of being withdrawn from the mold hot. The product had a resistivity of about 1 ohm-centimeter.

It has been previously pointed out that the resistivity of the molded product varies in accordance with the character of the carbon used for cladding the plastic particles. This fact is brought out by a comparison between Examples 1 and 2 which show that when acetylene black was used, substantially lower resistivities were obtained than when graphite was used. Hence, by appropriately selecting the type of carbon used, products having various desired resistivities may be obtained.

It will appreciated that molding powders treated in accordance with the present invention may be advantageously utilized in compression, injection and extrusion molding operations. Also, these products may be used not only as previously mentioned in the manufacture of electrical circuit elements, but also in making plastic bearings, as well as table tops and floor coverings for operating rooms or other places where dissipation of electrostatic charges is desired.

Articles molded from the carbon-coated powders of the present invention are characterized by a reticulate carbon structure, that is, the articles are predominantly composed of the plastic but have a fine, lacy network of carbon therein that provides a multiplicity of conductive paths through the body of the plastic.

In the present application and particularly in the appended claims, the phrase "plastic in comminuted form" is used. It should be noted that the word "comminuted" merely indicates that the plastic is in a discrete, particulate form and does not necessarily imply that this particulate form was arrived at by subdivision of larger plastic masses. Similarly, the phrases "finely divided carbon" and "finely divided metal" are not intended to carry any implication as to the manner in which the fine state of sub-division is arrived at.

Since many embodiments might be made of the present invention and since many changes might be made in the embodiment disclosed herein, it is to be understood that the foregoing description is to be interpreted as illustrative only and not in a limiting sense.

What is claimed is:

1. A molding plastic product adapted for molding conductive plastic articles consisting essentially of a synthetic organic molding plastic in comminuted form and about 0.1 to 25.0% of finely divided carbon based on the weight of said plastic, said carbon being attached to the surfaces of the particles of said plastic and covering a major proportion of said surfaces to coat the same, said coated particles being plastically deformable to permit molding under the usual molding conditions for the plastic used to produce a product substantially free from voids.

2. A molding plastic product adapted for molding conductive plastic articles consisting essentially of a synthetic organic molding plastic in comminuted form and about 1% to 15% of finely divided carbon based on the weight of said plastic, said carbon being attached to the surfaces of the particles of said plastic and covering a major proportion of said surfaces to coat the same, said coated particles being plastically deformable to permit molding under the usual molding conditions for the plastic used to produce a product substantially free from voids.

3. A molding plastic product adapted for molding conductive plastic articles consisting essentially of a synthetic organic molding plastic in comminuted form and about 1% to 15% of finely divided carbon based on the weight of said plastic, said carbon being disposed as a substantially uniform coating on the particles of said plastic and covering at least about 0.9 of the surface of said particles, said coated particles being plastically deformable to permit molding under the usual molding conditions for the plastic used to produce a product substantially free from voids.

4. The molding plastic product of claim 3 and wherein the carbon is graphite.

5. The molding plastic product of claim 3 and wherein the carbon is acetylene black.

6. A molding plastic product adapted for molding conductive plastic articles, consisting essentially of a synthetic organic molding plastic in comminuted form and a minor proportion of carbon attached to the plastic particles as a coating, said carbon satisfying the requirements that $R_A$ be in the range of about 0.55 to 1.00 and $R_V$ be in the range of about 0.00042 to 0.29 where $$R_A = \frac{A_C}{A_B}$$

and $$R_V = \frac{V_C}{V_P + V_C}$$

$A_P$ being the surface area of said plastic, $A_C$ the surface area of said plastic covered with said carbon, $V_P$ the volume of said plastic and $V_C$ the volume of said carbon, said coated particles being plastically deformable to permit molding under the usual conditions for the plastic used to produce a product substantially free from voids.

7. A molding plastic product adapted for molding conductive plastic articles, consisting essentially of a synthetic organic molding plastic in comminuted form and a minor proportion of carbon attached to the plastic particles as a coating, said carbon satisfying the requirements that $R_A$ be in the range of about 0.55 to 1.00 and $R_V$ be in the range of about 0.0042 to 0.18 where $$R_A = \frac{A_C}{A_P}$$

and $$R_V = \frac{V_C}{V_P + V_C}$$

$A_P$ being the surface area of said plastic, $A_C$ the surface area of said plastic covered with said carbon, $V_P$ the volume of said plastic and $V_C$ the volume of said carbon, said coated particles being plastically deformable to permit molding under the usual molding conditions for the plastic used to produce a product substantially free from voids.

8. A molding plastic product adapted for molding conductive plastic articles, consisting essentially of a synthetic organic molding plastic in comminuted form and a minor proportion of carbon attached to the plastic particles as a coating, said carbon satisfying the requirements that $R_A$ be in the range of about 0.90 to 1.00 and $R_V$ be in the range of about 0.0042 to 0.18 where $$R_A = \frac{A_C}{A_P}$$

and $$R_V = \frac{V_C}{V_P + V_C}$$

$A_P$ being the surface area of said plastic, $A_C$ the surface area of said plastic covered with said carbon, $V_P$ the volume of said plastic and $V_C$ the volume of said carbon, said coated particles being plastically deformable to permit molding under the usual molding conditions for the plastic used to produce a product substantially free from voids.

9. The process of producing conductive molded plastic articles which comprises depositing a thin coating of finely divided carbon over a major proportion of the surfaces of the particles of a comminuted synthetic organic molding plastic and molding said articles from the resulting coated plastic particles under the usual molding conditions for the plastic used to produce articles free from voids.

10. The process of producing a conductive molded plastic article which comprises mixing particles of a comminuted synthetic organic molding plastic with relatively smaller particles of finely divided carbon, agitating the resulting mixture to cause said carbon particles to clad a major proportion of the surfaces of said comminuted plastic particles and molding said article from the resulting coated plastic particles under the usual molding conditions for the plastic used to produce articles free from voids.

11. The process of producing conductive molded plastic articles which comprises depositing a thin coating of finely divided carbon over a major proportion of the surfaces of the particles of a comminuted synthetic organic molding plastic, applying a thin layer of finely divided metal to the carbon-coated surface of the plastic particles and molding said articles from the resulting coated plastic particles.

12. A molding plastic product adapted for molding conductive plastic articles consisting essentially of a synthetic organic molding plastic in comminuted form, a major proportion of the surfaces of the particles of said plastic being coated with finely divided carbon and a finely divided metal.

13. The process of producing conductive molded plastic articles which comprises depositing a coating of carbon over a major proportion of the surfaces of the particles of a comminuted synthetic organic molding plastic and molding said articles from the resulting coated plastic particles under the usual molding conditions for the plastic used to produce articles free from voids.

14. A conductive plastic article composed of a body of synthetic organic plastic having a reticulate structure of carbon extending therethrough, said carbon comprising from 1 to 15% by weight of said article.

15. A conductive plastic article composed of a body of synthetic organic plastic having a reticulate structure of carbon extending therethrough, said carbon comprising from 1 to 15% by weight of said article and being the sole non-plastic constituent of said article.

16. A non-porous conductive plastic article molded from a comminuted synthetic organic plastic, the particles of which have a major proportion of their surfaces coated with carbon.

17. A molding plastic product adapted for molding conductive plastic articles which consists essentially of a synthetic organic molding plastic in comminuted form and about 1% to 15% of finely divided carbon based on the weight of said plastic, said carbon being attached to the surfaces of the particles of said plastic and covering a major proportion of said surfaces to coat the same, said coated particles being plastically deformable under the usual molding conditions for the plastic used to produce a product substantially free from voids.

References Cited in the file of this patent

UNITED STATES PATENTS

| Number | Name | Date |
|---|---|---|
| 1,299,846 | McCoy | Apr. 8, 1919 |
| 2,020,085 | Smith | Mar. 11, 1932 |
| 2,120,549 | Dike | June 14, 1938 |
| 2,151,083 | Christensen et al. | Mar. 21, 1939 |
| 2,406,345 | Brennan | Aug. 27, 1946 |
| 2,472,801 | Barfield et al. | June 14, 1949 |
| 2,509,652 | Rushmer et al. | May 30, 1950 |
| 2,526,059 | Zabel et al. | Oct. 17, 1950 |
| 2,543,536 | Sherman | Feb. 27, 1951 |